(12) United States Patent
Mertens

(10) Patent No.: US 7,642,908 B2
(45) Date of Patent: Jan. 5, 2010

(54) ELEVATED LIGHT SYSTEM FOR VEHICLES

(75) Inventor: Jens Mertens, Esslingen (DE)

(73) Assignee: odelo GmbH, Schwaikheim (DE)

( * ) Notice: Subject to any disclaimer, the term of this patent is extended or adjusted under 35 U.S.C. 154(b) by 464 days.

(21) Appl. No.: 11/393,247

(22) Filed: Mar. 30, 2006

(65) Prior Publication Data
US 2006/0220825 A1   Oct. 5, 2006

(30) Foreign Application Priority Data
Mar. 30, 2005   (DE) .................... 10 2005 014 816

(51) Int. Cl.
*B60Q 1/22* (2006.01)
(52) U.S. Cl. .................... 340/463; 340/468; 340/479
(58) Field of Classification Search ......... 340/463–469, 340/472, 479; 307/9.1, 10.8; 362/487, 459
See application file for complete search history.

(56) References Cited

U.S. PATENT DOCUMENTS

| | | | | | |
|---|---|---|---|---|---|
| 3,868,629 | A | * | 2/1975 | Caine | 340/435 |
| 4,556,862 | A | * | 12/1985 | Meinershagen | 340/478 |
| 4,600,913 | A | * | 7/1986 | Caine | 340/435 |
| 4,791,401 | A | * | 12/1988 | Heidman, Jr. | 340/477 |
| 4,954,808 | A | * | 9/1990 | Duerkob | 362/541 |
| 5,211,466 | A | * | 5/1993 | Jarocki et al. | 362/540 |
| 5,272,602 | A | * | 12/1993 | Sasajima et al. | 362/549 |
| 5,289,353 | A | * | 2/1994 | Sasajima et al. | 362/549 |
| 6,345,906 | B1 | * | 2/2002 | Bahne et al. | 362/543 |
| 6,508,577 | B2 | * | 1/2003 | Werner et al. | 340/479 |
| 6,753,769 | B1 | * | 6/2004 | Elliott | 340/464 |
| 7,268,679 | B2 | * | 9/2007 | Garcia Briz | 340/469 |
| 2003/0053317 | A1 | | 3/2003 | Mertens | |
| 2006/0125615 | A1 | * | 6/2006 | Song | 340/463 |

FOREIGN PATENT DOCUMENTS

GB   2274358 A   *   7/1994

* cited by examiner

*Primary Examiner*—Eric M Blount
(74) *Attorney, Agent, or Firm*—Reising Ethington P.C.

(57) ABSTRACT

A light system for a vehicle includes a light casing that is fixedly secured to the motor vehicle. The light casing includes brake, fog and spacer sections with the spacer section separating the brake section from the fog section. A controller is fixedly secured to the light casing for receiving electrical power and control signals from the vehicle. A brake light source is disposed within the brake section of the light casing and is electrically connected to the controller to receive the control signals and to selectively emit light based on the signals. The light system also includes a fog light source disposed within the fog section of the light casing. The fog light source is electrically connected to the controller to selectively emit light based on the control signals. The spacer section allows one that is following the vehicle to distinguish between the brake and for light sources.

9 Claims, 3 Drawing Sheets

ELEVATED LIGHT SYSTEM FOR VEHICLES

BACKGROUND ART

1. Field of the Invention

The invention relates to an elevated brake light system for vehicles. More particularly, the invention relates to an elevated light system having multiple signal capabilities.

2. Description of the Related Art

Brake light systems having elevated brake lights are disclosed in German Patent DE 101 45 528 A1. In this disclosure, the elevated brake light has a light casing which contains at least one lighting means for emitting a brake light. Such elevated brake light systems differ from traditional brake light systems due to its elevated position on the vehicle, which increases the recognizability of the brake light emitted therefrom for the following traffic. Such elevated brake light systems thus serve to increase the safety of the vehicle equipped with them. Another elevated brake light is described in U.S. Pat. No. 5,211,466.

SUMMARY OF THE INVENTION

A light system for a motor vehicle includes a light casing that is fixedly secured to the motor vehicle. The light casing includes a brake section, a fog section and a spacer section. A controller is fixedly secured to the light casing for receiving electrical power and control signals from the motor vehicle. A brake light source is disposed within the brake section of the light casing. The brake light source is electrically connected to the controller to receive the control signals and to selectively emit light based on the control signals. The light system also includes a fog light source disposed within the fog section of the light casing. The fog light source is electrically connected to the controller to selectively emit light based on the control signals, wherein the brake light source and the fog light source are separated by the spacer section.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE PREFERRED EMBODIMENTS

The invention is based on the general idea of integrating a rear fog light into the elevated brake light system. A vehicle equipped in this way can emit a rear fog light toward the rear from an elevated position, which can thus increase the recognizability of the rear fog light by the following traffic. To this extent, the inventive brake light system leads to increased visibility of the vehicle equipped therewith. This is achieved with the invention by providing at least one lighting means for emitting the rear fog light in the light casing of the elevated brake light system. Consequently, both the lighting means for emitting the brake light and the lighting means for emitting the rear fog light are arranged in the same light casing. This creates a uniform module with which both the elevated brake light and the integrated elevated rear fog light can be mounted on the respective vehicle. The elevated brake light system according to the invention also has an added function due to the integration of the rear fog light without thereby having to increase the cost of assembling the brake light system.

Figure 1:
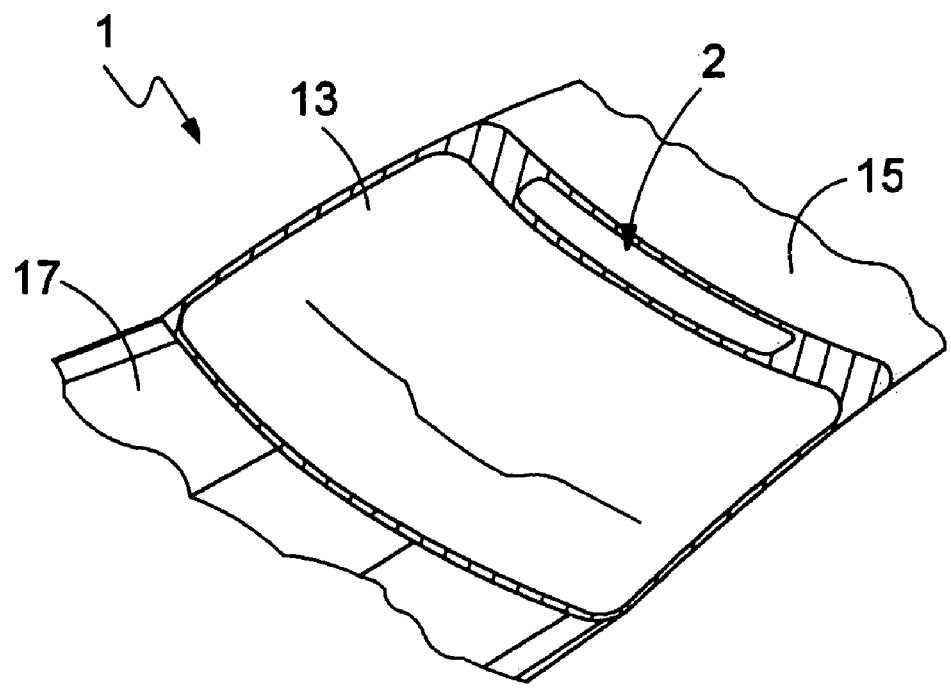
FIG. 1 is a highly simplified perspective view of a trunk area of a motor vehicle, partially cut away.

Referring to FIG. 1, a vehicle 1, preferably a motor vehicle, i.e., a motor-operated street vehicle, may be equipped with an elevated brake light system 2 according to this invention. The elevated brake light system 2 in the exemplary embodiment is arranged along an upper edge of a rear window 13 of the vehicle 1 and serves to implement an elevated brake light which is usually also referred to as the third brake light.

Figure 2:
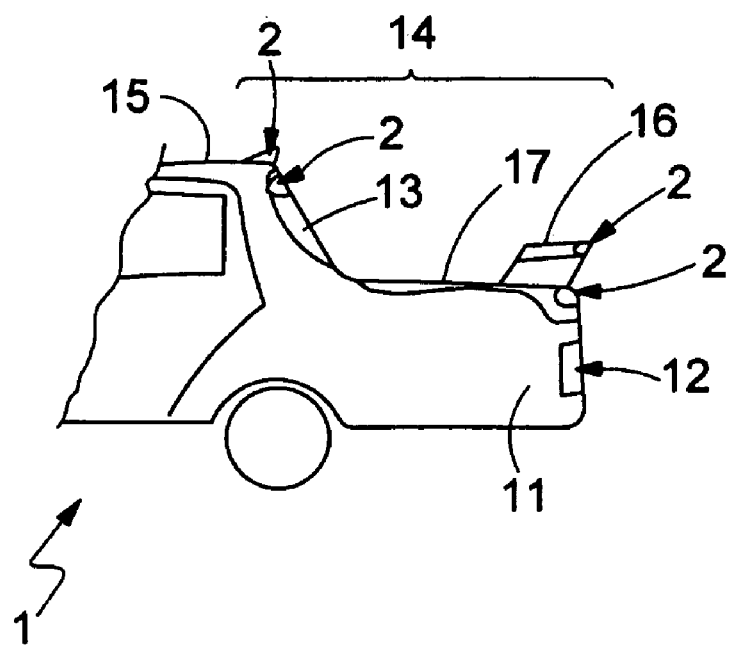
FIG. 2 is a side view of a trunk area of a motor vehicle, partially cut away.

Referring to FIG. 2, such an elevated brake light system 2 is shown mounted in a rear end area 14 of the vehicle 1 in various elevated positions. In addition to the arrangement above the rear window 13 (FIG. 1), the brake light system 2 may also be arranged inside the rear window 13 in an upper section. Furthermore, it is possible to arrange such an elevated brake light system 2 in an area of a rear roof edge which limits a vehicle roof 15 toward the rear. Likewise, the elevated brake light system 2 may also be integrated into a rear end spoiler 16 of vehicle 1. In addition, it is also possible to mount the elevated brake light system 2 on a rear end edge of a trunk lid 17 of the vehicle 1. The preceding list of possible mounting sites for the elevated brake light system 2 does not make any claims at thoroughness and is given without any restriction of generality, so that other positions not mentioned here are also feasible for the elevated brake light system 2. The elevated brake light system 2 differs from traditional brake light systems 12 which are arranged on the rear end 11 of the vehicle 1 in that the elevated brake light system 2 is arranged at a higher level and accordingly it can emit its brake light toward the rear from an elevated position. This increases the recognizability of the brake light for the following traffic.

Referring to FIGS. 3 through 7, the elevated brake light system 2 includes a lamp casing 3. Preferably, all the components of the brake light system 2 are arranged in or on the light casing 3 to thereby form a unit that can be completely preassembled and easily mounted on the vehicle 1. The light casing 3 has multiple lighting units 4 provided in it. At least one of these lighting units 4, a brake light source, serves to emit the brake light during operation of the brake light system 2. In addition, at least one of these lighting units 4, a fog light source, serves to emit the rear fog light.

Preferably, as in the present case, the individual lighting units 4 are arranged in at least two sections that are separated from one another. One of these sections forms a brake section 5, which contains at least one, preferably several lighting units 4. The lighting units 4 of the brake section 5 emit the brake light when the brake light function is activated.

At least one of the aforementioned sections is a fog section 6, which contains at least one lighting unit 4, but preferably several such lighting units 4 that make up the fog light source. The lighting units 4 of the fog section 6 emit the rear fog light when the rear fog light function is activated. The two different sections 5 and 6 are arranged inside the light casing 3 so that they are separated in space from one another, i.e., the individual sections 5, 6 do not have any common overlap area nor do these sections 5, 6 share a border or a portion of their respective perimeters. This makes it possible to achieve a clear visual separation of the brake light from the rear fog light.

Figure 3:
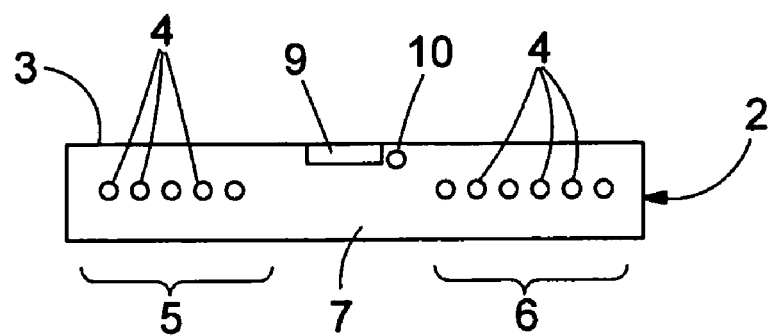
FIGS. 3 through 7 are schematic views of various embodiments of the invention, shown in the direction opposite the direction of light emission.

In the embodiment depicted in FIG. 3, a spacer section defined by a distance 7 extends between the brake section 5 and the fog section 6 and is designed to be free of any light source, i.e., not to contain any lighting units 4. In this way, the spatial separation of the brake section 5 and the fog section 6 can be improved. At the same time, the brake light system 2 thereby has a comparatively simple design which can be implemented inexpensively.

Figure 4:
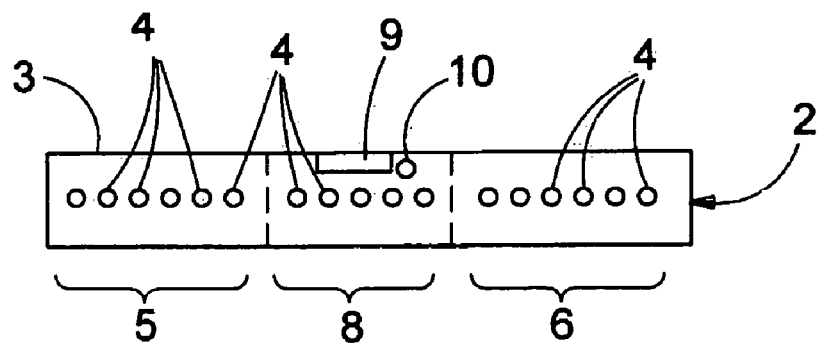

In a preferred embodiment shown in FIG. 4, at least one of the aforementioned sections may be designed as a spacer section 8. This spacer section 8 is arranged between a brake section 5 and a fog section 6 and contains at least one spacer light source 4. Preferably, the spacer light source 4 would include a plurality of lighting units 4. When the rear fog light function is activated, the lighting units 4 of the spacer section 8 are be deactivated, thus simulating, when the rear fog light is activated, a spatial distance between the brake section and the fog section 6. By turning off the spacer light source, a perception that the spacer section 8 is visually identical to the distance 7, which is free of any lighting source.

Figure 5:
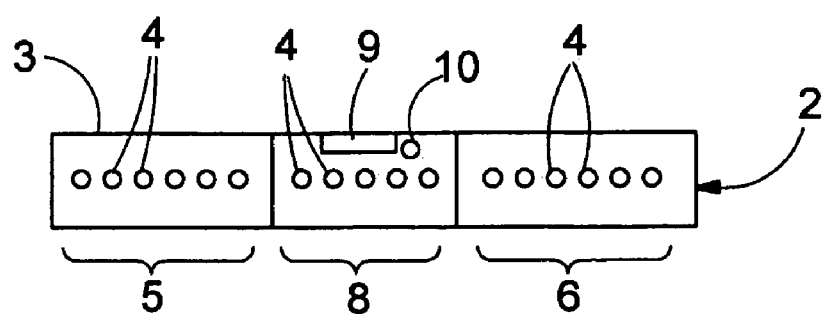
Figure 6:
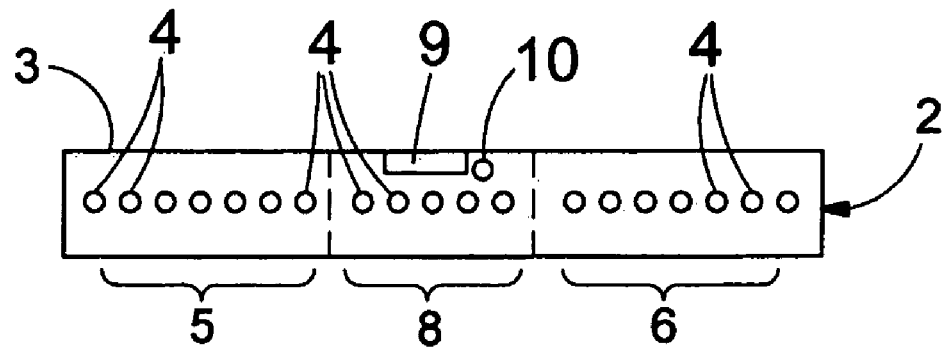

FIG. 5 shows the operation of the brake light system 2 when the rear fog light function is activated. The lighting units 4 of the fog section 6 are activated for emitting the rear fog light, which is symbolized by solid circles. The lighting units 4 of the spacer section 8 are deactivated, which is indicated by empty circles. When the rear fog light function is activated, the brake light can be emitted. To do so, the lighting units 4 of the brake section 5 are activated, which is again indicated by solid circles in FIG. 5. FIG. 5 thus illustrates a condition of the brake light system 2 in which the rear fog light function is activated and the brake light function is activated at the same time. When the rear fog light function is activated, the lighting units 4 of the spacer section 8 remain deactivated even when the brake light function is activated.

In a preferred embodiment, when the rear fog light function is deactivated, it is also possible to use the lighting units 4 of the fog section 6 in addition to the lighting units 4 of the brake section 5 to implement the brake light. In other words, to emit the brake light, the lighting units 4 of the brake section 5 and the lighting units 4 of the fog section 6 may be activated simultaneously. If a spacer section 8 having lighting units 4 is provided, then with the rear fog light function deactivated, the lighting units 4 of the spacer section 8 may also be used for implementation of the brake light. Accordingly, in the case of a braking operation according to FIG. 6, the lighting units 4 of the brake section 5 and the lighting units 4 of the fog section 6 as well as the lighting units 4 of the spacer section 8 may be activated simultaneously to emit a particularly bright brake light, i.e., light having a high luminosity.

In addition, it is also fundamentally possible to design the elevated brake light system 2 in such a way that at least one of the lighting units 4 is designed for emitting blue light. Such a blue light, preferably emitted as a flashing light, characterizes, for example, service vehicles used by the police, fire departments and hospitals.

Alternatively or additionally, it is likewise possible to design the brake light system 2 in such a way that at least one of the lighting units 4 serves to emit a signal light. Such a signal light, which is yellow in particular and/or is emitted as a flashing light, may signal a breakdown situation and may preferably be tied into a flashing warning light system of the vehicle 1, which usually operates flashing lights on the vehicle 1 for emitting the flashing light signal when it is activated. Expediently, the signal light emitted with the help of the brake light system 2 is selected to be of the same color as the signal light of the flashing lights of the vehicle, e.g., yellow.

Additionally or alternatively, the elevated brake light system 2 may also be designed in such a way that at least one of the lighting units 4 emits a back-up light, i.e., a white light. The elevated position of the back-up light improves the view for the driver of the vehicle at the rear in driving maneuvers and thereby increases driving safety.

The aforementioned additional light functions can be integrated especially advantageously in the case of the inventive raised brake light system 2 by the fact that the same lighting units 4 are used in at least some cases for emitting the different lights. For example, the lighting units 4 which emit the brake light when the brake light function is activated may also emit the blue light when the blue light function is activated and/or may emit the signal light when the signal light function is activated and/or may emit the back-up light when the back-up light function is activated. Alternatively, the aforementioned additional light functions may also be implemented with the help of the lighting units 4 which emit the rear fog light when the rear fog light function is activated. The preferred embodiment is, however, one in which all the lighting units 4 are used for implementation of the aforementioned additional light functions, i.e., the lighting units 4 of the brake section 5 and the lighting units 4 of the fog section 6 and, if present, lighting units 4 of the spacer section 8.

In order for the same lighting units 4 to be used for emitting the brake light, which is usually red, for the rear fog light, which is usually red and also for the blue light and/or for the signal light, which is yellow in particular, and/or for the back-up light, which is preferably white, the lighting units 4 may preferably be designed as polychromic light-emitting diodes (LEDs) which are capable of emitting light optionally in at least two different colors.

Alternatively, the different light functions may also be implemented with different lighting units 4 accordingly which are optimized according to their particular light function. For example, red light-emitting diodes are provided to implement the brake light and the rear fog light. In addition, blue light-emitting diodes may also be provided for the blue light and/or yellow light-emitting diodes for the signal light and/or white light-emitting diodes for the back-up light. However, the approach of using lighting units 4 having the same design as described above is preferred.

According to the embodiments shown here, the lighting units 4 are preferably arranged side-by-side in a horizontal direction. In this way, the elevated brake light system 2 is in the form of a luminous strip.

As already explained above, the lighting units 4 may expediently also be designed as light-emitting diodes. It is likewise fundamentally possible for at least one or all of the lighting units 4 to be designed as conventional incandescent lamps.

To improve visual recognition of the brake light and the rear fog light, the elevated brake light system 2 in another embodiment may be designed so that the lighting units 4 for emitting the rear fog light on the one hand and the lighting units 4 for emitting the brake light on the other hand may have and/or implement different luminosities.

Figure 7:
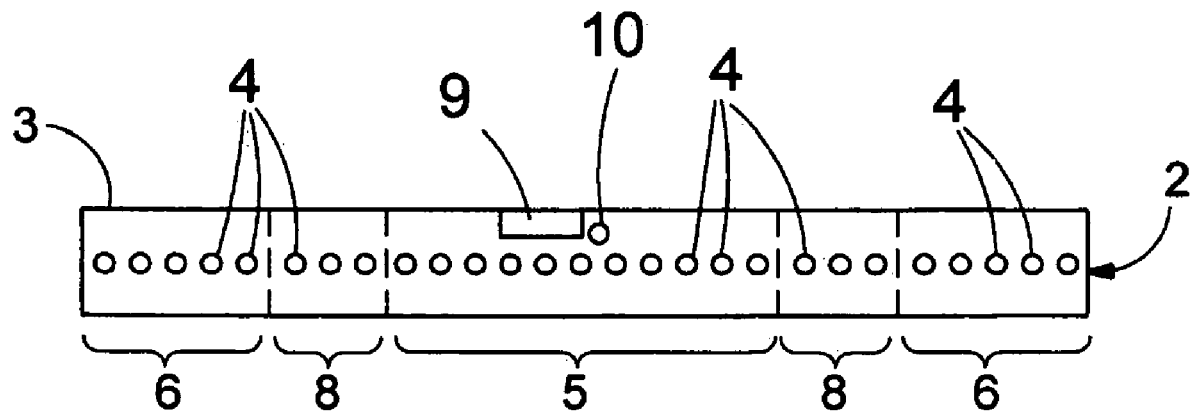

FIG. 7 shows another embodiment in which the individual lighting units 4 are subdivided into a total of five sections, namely two fog sections 6 arranged on the outside, one centrally arranged brake section 5 and two spacer sections 8, each arranged between one of the fog sections 6 and the brake section 5. It is clear that other arrangements are also possible.

The brake light system 2 is expediently equipped with a control unit 9 with the help of which the lighting units 4 can be activated. This control unit 9 is preferably arranged in the light casing 3. The control unit 9 is designed so that the individual light functions can be implemented with it, i.e., at least the brake light function and the rear fog light function as well as optionally at least one of the following functions: blue light function, signal light function and back-up light function. In addition, the control unit 9 is preferably also designed so that the aforementioned division of the lighting units 4 into the different sections is possible, namely the at least one brake section 5 and the at least one fog section 6 and optionally the at least one spacer section 8. The control unit 9 receives power and control signals from the electronics system (not shown) on the vehicle 1. Based on the control signals, the control unit 9 provides power to the various lighting units 4 allowing the lighting units 4 to emit light at various levels of intensity. By way of example, a brake signal may produce a light intensity that is less than the intensity of light emitted for a fog signal.

In the preferred embodiments illustrated here, the brake light system 2 is also connected to a fog sensor 10 which is in turn connected to the control unit 9 and may also be accommodated in the light casing 3 in particular. The control unit 9 can automatically activate or deactivate the rear fog light as a function of the signals of the fog sensor 10.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

The invention claimed is:

1. A light system for a motor vehicle designed to emit a brake light when selected and a fog light when selected, said light system comprising:
   a light casing fixedly secured to the motor vehicle, said light casing including a brake section, a fog section and spacer section disposed between said brake section and said fog section;
   a brake light source disposed within said brake section of said light casing, said brake light source selectively emitting the brake light;
   a fog light source disposed within said fog section of said light casing, said fog light source selectively emitting the brake light when selected and emitting the fog light when selected; and
   a spacer light source disposed within said spacer section of said light casing for selectively emitting the brake light when the fog light is not selected such that all of said light casing emits the brake light continuously thereacross when the fog light is not selected.

2. A light system as set forth in claim 1 including a fog sensor for sensing the presence of fog.

3. A light system as set forth in claim 2 wherein said brake light source includes a plurality of brake light units.

4. A light system as set forth in claim 3 wherein said fog light source includes a plurality of fog light units.

5. A light system as set forth in claim 4 wherein said fog section is divided in two and separated by said brake section.

6. A light system as set forth in claim 5 wherein said spacer section is divided in two wherein each of said spacer sections separates one of said fog sections from said brake section.

7. A method for operating a light system in a light casing having a brake light source, a fog light source and a spacer light source disposed between the brake light source and the fog light source, the method comprising the steps of:
   emitting light continuously across all of the light casing from the brake light source and the spacer light source and the fog light source at a brake light level of intensity when the brake light is selected;
   increasing the intensity of the light emitted by the fog light source when the fog light is selected while maintaining the emission of the brake light source at the brake light level of intensity; and
   turning off the brake light emitted by the spacer light source when the fog light is selected to create a non-illuminated space between the brake and fog light sources when the fog light is selected.

8. A method as set forth in claim 7 wherein the fog light source reduces the emissions when the fog light is deselected.

9. A method as set forth in claim 8 wherein the spacer light source emits light at the brake light level of intensity after the fog signal is turned off and while the controller receives the brake signal.

\* \* \* \* \*

UNITED STATES PATENT AND TRADEMARK OFFICE
CERTIFICATE OF CORRECTION

PATENT NO. : 7,642,908 B2  Page 1 of 1
APPLICATION NO. : 11/393247
DATED : January 5, 2010
INVENTOR(S) : Jens Mertens It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 745 days.

Signed and Sealed this

Twenty-first Day of December, 2010

David J. Kappos
*Director of the United States Patent and Trademark Office*